US012650706B2

(12) United States Patent
Su

(10) Patent No.: US 12,650,706 B2
(45) Date of Patent: Jun. 9, 2026

(54) POWER SUPPLY CIRCUIT AND UNDERSHOOT SUPPRESSION CIRCUIT THEREOF

(71) Applicant: PowerX Semiconductor Corporation, Hsinchu County (TW)

(72) Inventor: Chih-Chieh Su, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 275 days.

(21) Appl. No.: 18/434,828

(22) Filed: Feb. 7, 2024

(65) Prior Publication Data

US 2025/0130605 A1 Apr. 24, 2025

(30) Foreign Application Priority Data

Oct. 18, 2023 (TW) ................................ 112139770

(51) Int. Cl.
*G05F 1/575* (2006.01)
*G05F 1/565* (2006.01)
*G05F 1/46* (2006.01)

(52) U.S. Cl.
CPC .............. *G05F 1/575* (2013.01); *G05F 1/565* (2013.01); *G05F 1/468* (2013.01)

(58) Field of Classification Search
CPC ........... G05F 1/575; G05F 1/565; G05F 1/468
See application file for complete search history.

(56) References Cited

U.S. PATENT DOCUMENTS

| | | | | |
|---|---|---|---|---|
| 8,836,307 | B2 | 9/2014 | Wan et al. | |
| 10,996,700 | B1 | 5/2021 | Tan | |
| 11,381,173 | B2 | 7/2022 | Chen et al. | |
| 2012/0013396 | A1 | 1/2012 | Morino et al. | |
| 2022/0382307 | A1 * | 12/2022 | Tse .......................... | G05F 1/565 |
| 2024/0176372 | A1 * | 5/2024 | Lee .......................... | G05F 1/462 |

FOREIGN PATENT DOCUMENTS

| | | | |
|---|---|---|---|
| CN | 113009956 | B | 5/2022 |
| JP | 2018106286 | A | 7/2018 |
| TW | 1470392 | B | 1/2015 |
| TW | M653061 | U | 3/2024 |

* cited by examiner

*Primary Examiner* — Lakaisha Jackson
(74) *Attorney, Agent, or Firm* — CKC & Partners Co., LLC

(57) ABSTRACT

The present disclosure provides a power supply circuit and an undershoot suppression circuit thereof. The undershoot suppression circuit includes a rising edge determination circuit, a falling edge determination circuit and a pulse generation circuit. The rising edge determination circuit detects a difference voltage between an output voltage of the power supply circuit and a reference voltage, and outputs a clock control signal with a first voltage level when the difference voltage is greater than a threshold voltage. The falling edge determination circuit detects the output voltage, and outputs a reset signal with the first voltage level when the output voltage is not smaller than the reference voltage. The pulse generation circuit generates an undershoot suppression pulse according to the clock control signal with the first voltage level and the reset signal with the first voltage level, so that the output voltage approaches the reference voltage.

20 Claims, 7 Drawing Sheets

POWER SUPPLY CIRCUIT AND UNDERSHOOT SUPPRESSION CIRCUIT THEREOF

CROSS-REFERENCE TO RELATED APPLICATION

This application claims priority to Taiwan Application Serial Number 112139770, filed Oct. 18, 2023, which is herein incorporated by reference in its entirety.

BACKGROUND

Technical Field

The present disclosure relates to an undershoot suppression circuit, and particularly relates to an undershoot suppression circuit applied to a power supply circuit.

Description of Related Art

Along with the development of semiconductor technology, the power supply circuit of good load transient response is of increasing importance. Some related technologies may set a threshold, and perform corresponding operations when the variation of the output voltage supplied to a load (e.g., an ascending or descending slope) is beyond the set threshold, to meet the needs of the load. However, these related technologies can only know whether the set threshold can effectively respond to load transient through testing the power supply circuit. If the test determines that the current threshold cannot effectively respond to load transient, it is necessary to set a new threshold and test again. Therefore, a new approach is needed to solve the above-mentioned problem.

SUMMARY

One aspect of the present disclosure provides an undershoot suppression circuit applicable to a control circuit of at least one power stage circuit. The control circuit is configured to control the at least one power stage circuit to generate an output voltage at an output node electrically coupled to the at least one power stage circuit. The undershoot suppression circuit includes a rising edge determination circuit, a falling edge determination circuit and a pulse generation circuit. The rising edge determination circuit is configured to output a clock control signal, to detect a difference voltage between the output voltage and a reference voltage, and to control the clock control signal to be in a first voltage level when the difference voltage is greater than a threshold voltage. The falling edge determination circuit is configured to output a reset signal, to detect the output voltage, and to control the reset signal to be in the first voltage level when the output voltage is not smaller than the reference voltage. The pulse generation circuit is electrically coupled to the rising edge determination circuit and the falling edge determination circuit, and is configured to receive the clock control signal and the reset signal, and to generate an undershoot suppression pulse according to the clock control signal with the first voltage level and the reset signal with the first voltage level, so that the output voltage approaches the reference voltage.

One aspect of the present disclosure provides a power supply circuit. The power supply circuit includes a control signal generation circuit, a plurality of power stage circuits and an undershoot suppression circuit. The control signal generation circuit is configured to output a plurality of control signals. The plurality of power stage circuits are electrically coupled to the control signal generation circuit and an output node of the power supply circuit, and are configured to receive the plurality of control signals, where the control signal generation circuit is configured to sequentially enable the plurality of power stage circuits through the plurality of control signals, so that an output voltage is generated at the output node. The undershoot suppression circuit is electrically coupled to the output node and the control signal generation circuit, and is configured to detect the output voltage and receive a reference voltage and a threshold voltage. The undershoot suppression circuit generates an undershoot suppression pulse to the control signal generation circuit in response to a detection that the output voltage is smaller than the reference voltage and that a difference between the output voltage and the reference voltage exceeds the threshold voltage, so that the output voltage approaches the reference voltage. The undershoot suppression circuit stops generating the undershoot suppression pulse to the control signal generation circuit in response to a detection that the output voltage is not smaller than the reference voltage.

To sum up, the rising edge of the undershoot suppression pulse is determined by detecting whether the difference voltage between the reference voltage and the output voltage is greater than the threshold voltage, and the falling edge of the undershoot suppression pulse is determined by the undershoot suppression circuit detecting whether the output voltage is not smaller than the reference voltage. The undershoot suppression circuit of the present disclosure can automatically control the output period of the undershoot suppression pulse according to the voltage level of the output voltage. Therefore, in comparison to some related technologies that require setting parameters and repeatedly adjusting them through testing to make appropriate load transient response, the power supply circuit employing the undershoot suppression circuit of the present disclosure has the advantages of automatic optimization of the load transient response, etc.

DETAILED DESCRIPTION

The following is detailed description made with embodiments accompanied by drawings, but the specific embodiments described are merely intended to explain rather than limit the present disclosure. The description of structures and operations is not intended to limit the order of implementation, and any device that is formed by a new combination of the elements and produces an equivalent effect shall fall within the scope of the present disclosure.

The terms used in the entire specification and the claims, unless specifically noted, generally have respective ordinary meanings in this field, in the present disclosure and in special content.

The terms "coupled" and "connected" used herein may both mean making direct real or electrical contact of two or more elements, or making indirect real or electrical contact with each other, and may also mean interoperation or interaction of two or more elements.

In the following embodiments, if an element or signal symbol is mentioned without specifying an index, the element or signal symbol may refer to any in an element or signal group to which the element or signal symbol belongs. For example, power stage circuit 11 may refer to one or more unspecific ones of power stage circuits 11[1]-11[8].

Figure 1:
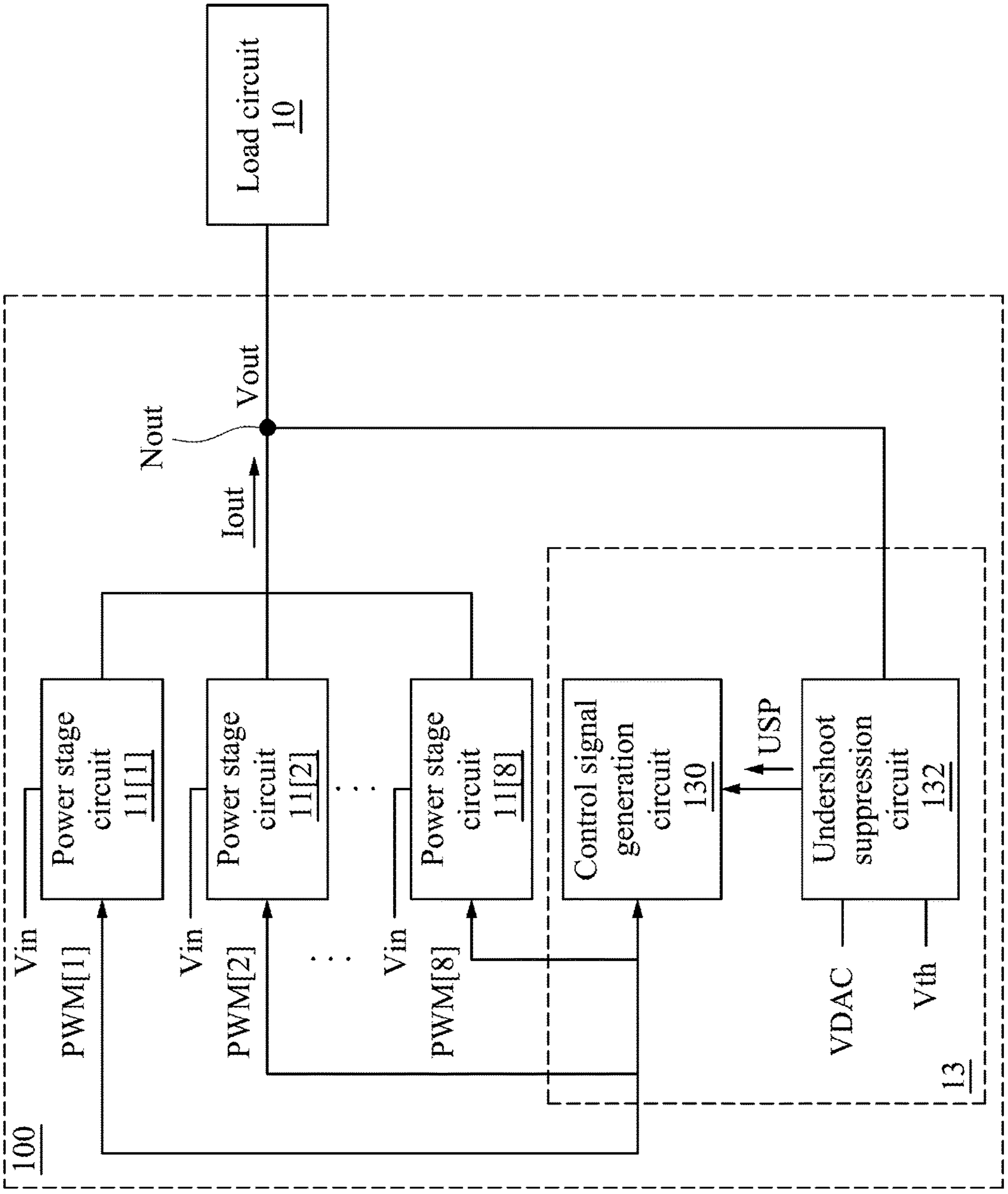
FIG. 1 is a block diagram of a power supply circuit according to some embodiments of the present disclosure.

Referring to FIG. 1, FIG. 1 is a block diagram of a power supply circuit 100 according to some embodiments of the present disclosure. In some embodiments, the power supply circuit 100 includes a plurality of power stage circuits 11[1]-11[8] and a control circuit 13. The power supply circuit 100 is electrically coupled to a load circuit 10 through an output node Nout, and is configured to supply power to the load circuit 10. Specifically, the load circuit 10 may be a processing circuit such as a central processing unit (CPU), an application-specific integrated circuit (ASIC), etc.

As shown in FIG. 1, the plurality of power stage circuits 11[1]-11[8] are electrically coupled to the control circuit 13, and a plurality of output ends of the plurality of power stage circuits 11[1]-11[8] are electrically coupled to the output node Nout of the power supply circuit 100. In addition, the control circuit 13 is also electrically coupled to the output node Nout. For illustrative purposes, 8 power stage circuits 11[1]-11[8] are depicted in the embodiment illustrated in FIG. 1, but the number of the power stage circuits 11 of the present disclosure is not limited thereto and may be any positive integer.

In some embodiments, each power stage circuit 11 is configured to receive an input voltage Vin, and to receive a corresponding control signal PWM from the control circuit 13. Specifically, the control signal PWM may be a pulse width modulation (PWM) signal. Accordingly, each power stage circuit 11 is configured to operate transistor switches (not shown in the figure) inside according to the corresponding control signal PWM. For example, as shown in FIG. 1, the power stage circuit 11[1] operates according to the control signal PWM[1], the power stage circuit 11[2] operates according to the control signal PWM[2], and so on. Also, the power stage circuit 11[8] operates according to the control signal PWM[8].

In some embodiments, as shown in FIG. 1, the control circuit 13 includes a control signal generation circuit 130 and an undershoot suppression circuit 132. The control signal generation circuit 130 is electrically coupled to the plurality of power stage circuits 11[1]-11[8]. The control signal generation circuit 130 is configured to output the plurality of control signals PWM[1]-PWM[8], and to sequentially enable the plurality of power stage circuits 11[1]-11[8] through the plurality of control signals PWM [1]-PWM[8] (namely, allowing each power stage circuit 11 to operate the transistor switches inside according to the corresponding control signal PWM), to generate an output voltage Vout converted from the input voltage Vin at the output node Nout. Furthermore, an output current Iout is also generated at the output node Nout. Specifically, the output current Iout may be the sum of a plurality of currents generated by the plurality of power stage circuits 11[1]-11[8].

In some practical applications, the load circuit 10 may need a large working current because of a temporary change in task, namely, the power supply circuit 100 needs to increase the value of the output current Iout. Due to some non-ideal factors, the plurality of power stage circuits 11[1]-11[8] cannot immediately increase the output current Iout to the value of the working current required by the load circuit 10. Therefore, a capacitor element (not shown in the figure) electrically coupled to the output node Nout in the power supply circuit 100 will discharge electricity to compensate for the lack of the output current Iout. Furthermore, the discharge of the above-mentioned capacitor element leads to an undershoot of the output voltage Vout.

In view of this, in some embodiments, the control circuit 13 is configured to mitigate the undershoot phenomenon of the output voltage Vout through operations of the undershoot suppression circuit 132. As shown in FIG. 1, the undershoot suppression circuit 132 is electrically coupled to the output node Nout and the control signal generation circuit 130. The undershoot suppression circuit 132 is configured to receive a reference voltage VDAC and a threshold voltage Vth, and to detect the output voltage Vout at the output node Nout. In some embodiments, the undershoot suppression circuit 132 executes corresponding operations according to the value of the output voltage Vout.

Specifically, in some embodiments, the output voltage Vout drops sharply (namely, the output voltage Vout experiences the undershoot) due to a change in the load circuit 10, and the undershoot suppression circuit 132 detects that the output voltage Vout is reduced to below the reference voltage VDAC and that a difference between the output voltage Vout and the reference voltage VDAC exceeds the threshold voltage Vth. Accordingly, the undershoot suppression circuit 132 generates an undershoot suppression pulse USP to the control signal generation circuit 130. Through the trigger of the undershoot suppression pulse USP, the control signal generation circuit 130 simultaneously enables the plurality of power stage circuits 11[1]-11[8] through the plurality of control signals PWM. It should be understood that the control signal generation circuit 130 does not simultaneously enable the plurality of power stage circuits 11[1]-11[8] in a continuous manner during the output period of the undershoot suppression pulse USP. Specifically, the control signal generation circuit 130 can preset the same duty ratio for each of the control signals PWM, to simultaneously enable/disable the plurality of power stage circuits 11[1]-11[8] according to the preset duty ratio during the output period of the undershoot suppression pulse USP. Such operation will be further described later with reference to FIG. 5. It should be noted that, through the plurality of power stage circuits 11[1]-11[8] enabled simultaneously, the output current Iout is increased, and the output voltage Vout approaches the reference voltage VDAC.

In some embodiments, the output voltage Vout is increased through the plurality of power stage circuits 11[1]-11[8] enabled simultaneously, and the undershoot suppression circuit 132 detects that the output voltage Vout rises to the reference voltage VDAC (namely, the output voltage Vout is not smaller than the reference voltage VDAC, which indicates that the undershoot phenomenon of the output voltage Vout is mitigated). Therefore, the undershoot suppression circuit 132 stops generating the undershoot suppression pulse USP to the control signal generation circuit 130. Accordingly, the control signal generation circuit 130 resumes sequentially enabling the plurality of power stage circuits 11[1]-11[8] through the plurality of control signals PWM[1]-PWM[8].

It can be seen from the description of the above-mentioned embodiments that, when the output voltage Vout experiences the undershoot, the undershoot suppression circuit 132 will trigger the control signal generation circuit 130 to simultaneously enable the plurality of power stage circuits 11[1]-11[8], to mitigate the undershoot phenomenon of the output voltage Vout.

Figure 2:
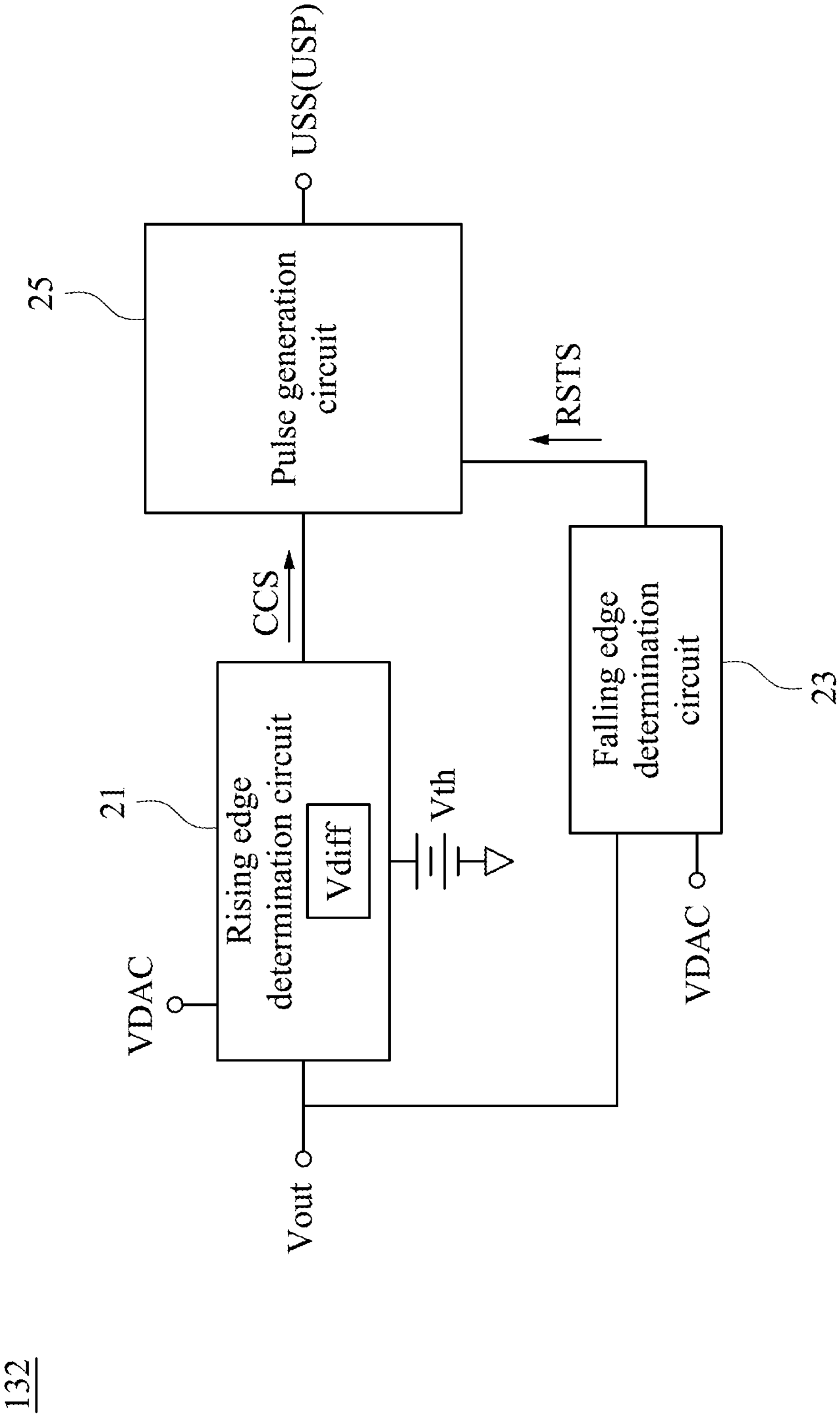
FIG. 2 is a block diagram of an undershoot suppression circuit according to some embodiments of the present disclosure.

Then, the circuit configuration of the undershoot suppression circuit 132 will be described with reference to FIG. 2 and FIG. 3 sequentially. Referring to FIG. 2, FIG. 2 is a block diagram of the undershoot suppression circuit 132 according to some embodiments of the present disclosure. In some embodiments, the undershoot suppression circuit 132 includes a rising edge determination circuit 21, a falling edge determination circuit 23 and a pulse generation circuit 25. As shown in FIG. 2, the rising edge determination circuit 21 is configured to receive the output voltage Vout, the reference voltage VDAC and the threshold voltage Vth, and to output a clock control signal CCS. The falling edge determination circuit 23 is configured to receive the output voltage Vout and the reference voltage VDAC, and to output a reset signal RSTS. In addition, the pulse generation circuit 25 is electrically coupled to the rising edge determination circuit 21 and the falling edge determination circuit 23, and is configured to receive the clock control signal CCS and the reset signal RSTS, and to output an undershoot suppression signal USS to the control signal generation circuit 130 in FIG. 1.

In some embodiments, the rising edge determination circuit 21 is configured to detect a difference voltage Vdiff between the output voltage Vout and the reference voltage VDAC. Specifically, the difference voltage Vdiff is the reference voltage VDAC minus the output voltage Vout. The rising edge determination circuit 21 is further configured to control the voltage level of the clock control signal CCS according to the result of comparison between the difference voltage Vdiff and the threshold voltage Vth. The falling edge determination circuit 23 is configured to detect the output voltage Vout, and to control the voltage level of the reset signal RSTS according to the result of comparison between the output voltage Vout and the reference voltage VDAC. The pulse generation circuit 25 is configured to control the voltage level of the undershoot suppression signal USS through the voltage level of the clock control signal CCS and the voltage level of the reset signal RSTS, to generate the undershoot suppression pulse USP.

Figure 3:
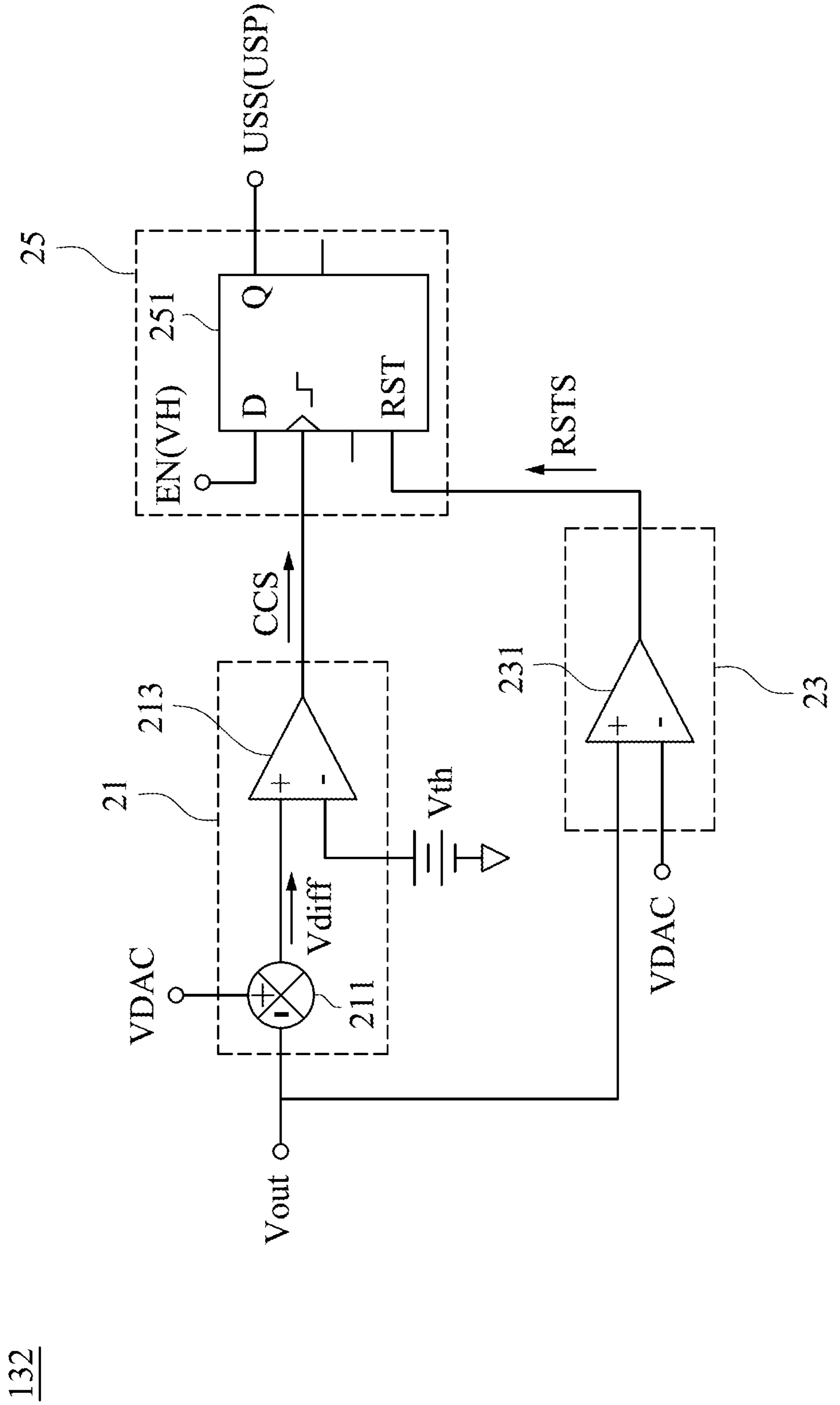
FIG. 3 is a schematic diagram of an undershoot suppression circuit according to some embodiments of the present disclosure.

Referring to FIG. 3, FIG. 3 is a block diagram of the undershoot suppression circuit 132 according to some embodiments of the present application. In some embodiments, the undershoot suppression circuit 132 includes a difference calculation circuit 211, a comparison circuit 213, a comparison circuit 231 and a flip-flop circuit 251. The difference calculation circuit 211 is configured to receive the output voltage Vout and the reference voltage VDAC, to generate the difference voltage Vdiff according to the output voltage Vout and the reference voltage VDAC. A non-inverting input end of the comparison circuit 213 is electrically coupled to an output end of the difference calculation circuit 211, to receive the difference voltage Vdiff, and an inverting input end of the comparison circuit 213 is configured to receive the threshold voltage Vth. A non-inverting input end of the comparison circuit 231 is configured to receive the output voltage Vout, and an inverting input end of the comparison circuit 231 is configured to receive the reference voltage VDAC. The flip-flop circuit 251 includes a data input end D, a reset end RST, a clock input end (located between the data input end D and the reset end RST) and a data output end Q. The flip-flop circuit 251 is electrically coupled to an output end of the comparison circuit 213 through the clock input end to receive the clock control signal CCS, is electrically coupled to an output end of the comparison circuit 231 through the reset end RST to receive the reset signal RSTS, and is electrically coupled to the control signal generation circuit 130 in FIG. 1 through the data output end Q to output the undershoot control signal USS to the control signal generation circuit 130. In addition, the data input end D of the flip-flop circuit 251 is configured to receive an enabling signal EN with a first voltage level VH.

In some embodiments, the difference calculation circuit 211 is configured to generate the difference voltage Vdiff according to a difference between the reference voltage VDAC and the output voltage Vout (namely, a result of subtracting the output voltage Vout from the reference voltage VDAC). The comparison circuit 213 is configured to compare the difference voltage Vdiff with the threshold voltage Vth, to generate the clock control signal CCS. The comparison circuit 231 is configured to compare the output voltage Vout and the reference voltage VDAC, to generate the reset signal RSTS. In addition, the flip-flop circuit 251 is configured to control the voltage level of the undershoot suppression signal USS through the clock control signal CCS and the reset signal RSTS, to generate the undershoot suppression pulse USP.

Specifically, in the embodiment illustrated in FIG. 3, the difference calculation circuit 211 can be realized with a subtracter, the comparison circuit 213 and the comparison circuit 231 can be realized with a comparator, and the flip-flop circuit 251 can be realized with a D flip-flop.

It can be seen from the description of FIG. 2 and FIG. 3 that, the difference calculation circuit 211 and the comparison circuit 213 can be used to realize the rising edge determination circuit 21, the comparison circuit 231 can be used to realize the falling edge determination circuit 23, and the flip-flop circuit 251 can be used to realize the pulse generation circuit 25. However, the present disclosure is not limited thereto, namely, it does not exclude other means of realizing the rising edge determination circuit 21, the falling edge determination circuit 23 and the pulse generation circuit 25.

Figure 4:
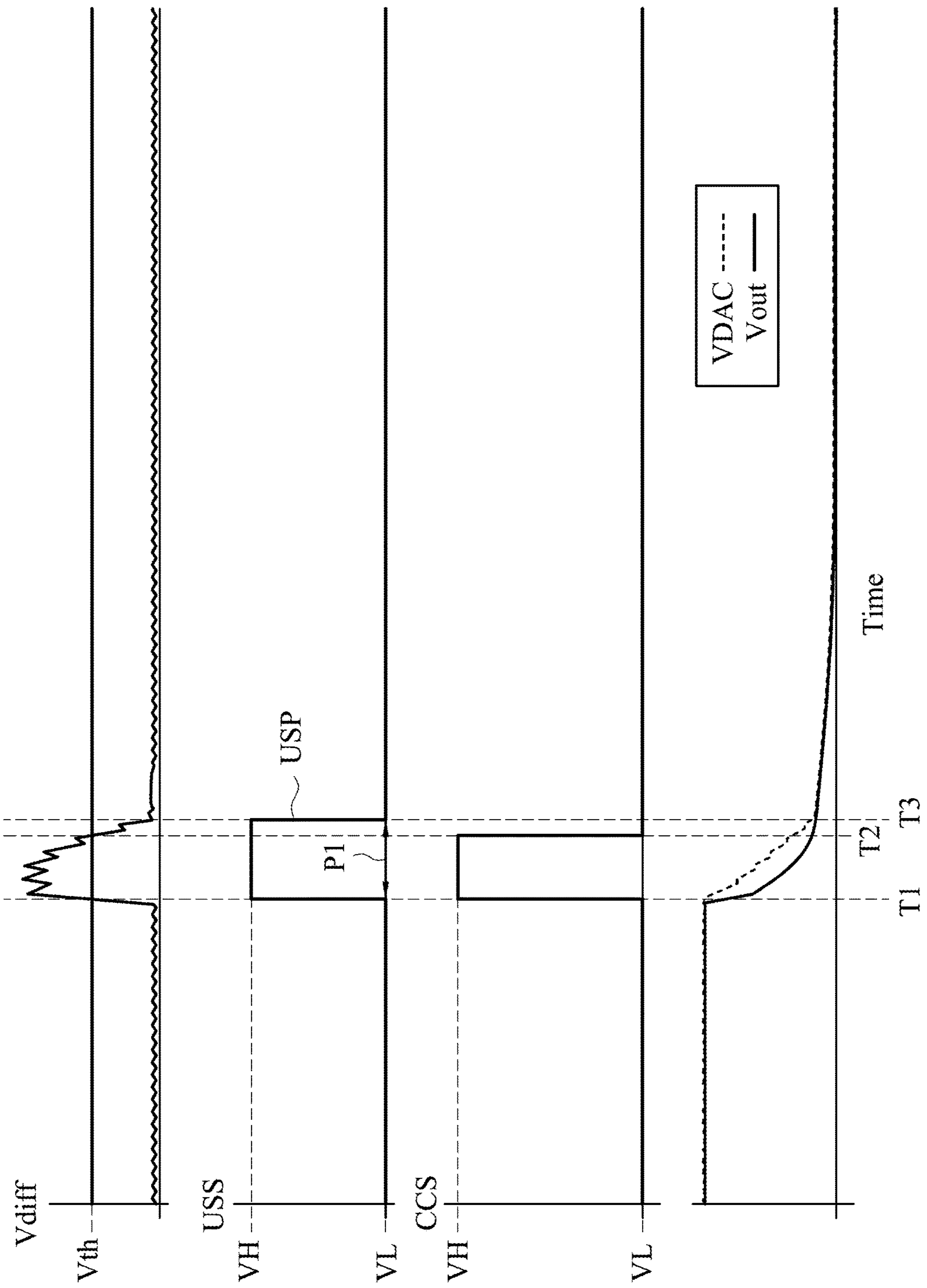
FIG. 4 is a signal sequence diagram of an undershoot suppression circuit according to some embodiments of the present disclosure.

Then, the operations of the circuits in the undershoot suppression circuit 132 will be further described with reference to FIG. 2, FIG. 3 and FIG. 4. Referring to FIG. 4, FIG. 4 is a signal sequence diagram of the undershoot suppression circuit 132 according to some embodiments of the present disclosure. In some embodiments, before the time point T1, due to the suddenly increased need for the working current in the load circuit 10, the above-mentioned capacitor element starts to discharge electricity, making the output current Iout rise and making the output voltage Vout to undershoot.

In some embodiments, the reference voltage VDAC is determined according to the value of the output current Iout. Specifically, the voltage level of the reference voltage VDAC can be calculated by substituting the output current Iout into the following equation (1), where VN in the equation (1) is a preset voltage value (e.g., 0.9 V), and Rload in the equation (1) is an equivalent resistance value of the load circuit 10 (e.g., 1 mΩ).

$$VDAC = VN - Iout \times Rload \quad (1)$$

It can be seen from FIG. 4 that, before the time point T1, the decrease amount of the output voltage Vout per unit time is greater than the decrease amount of the reference voltage VDAC (denoted by the dashed line in FIG. 4) per unit time. Therefore, in some embodiments, at the time point T1, the output voltage Vout is reduced to below the reference voltage VDAC, and a difference between the two (namely, the difference voltage Vdiff) is greater than the threshold voltage Vth. Accordingly, at the time point T1, the comparison circuit 213 in FIG. 3 generates the clock control signal CCS with the first voltage level VH.

In some embodiments, as shown in FIG. 3, since the clock input end of the flip-flop circuit 251 receives the clock control signal CCS with the first voltage level VH, the flip-flop circuit 251 outputs, through the data output end Q, the data received by the data input end D. In other words, as shown in FIG. 4, at the time point T1, the flip-flop circuit 251 switches, in response to the clock control signal CCS with the first voltage level VH, the voltage level of the undershoot suppression signal USS to the first voltage level VH of the enabling signal EN, to generate the undershoot suppression pulse USP.

After the time point T1, as described in the embodiment illustrated in FIG. 1, the control signal generation circuit 130 is triggered by the undershoot suppression pulse USP to simultaneously enable the plurality of power stage circuits 11[1]-11[8] through the plurality of control signals PWM [1]-PWM[8], to increase the output current Iout and the output voltage Vout. It can be seen from FIG. 4 that the decrease amount of the output voltage Vout per unit time is reduced through the plurality of power stage circuits 11[1]-11[8] enabled simultaneously. Moreover, as shown in the above equation (1), since VN and Rload in the equation (1) are substantially fixed values, the voltage level of the reference voltage VDAC is reduced with the increase of the value of the output current Iout, as shown in FIG. 4. Therefore, the output voltage Vout will gradually approach the reference voltage VDAC.

In some embodiments, as shown in FIG. 4, at the time point T2, the difference voltage Vdiff obtained by subtracting the output voltage Vout from the reference voltage VDAC is not greater than the threshold voltage Vth. Accordingly, at the time point T2, the comparison circuit 213 in FIG. 3 generates the clock control signal CCS with a second voltage level VL. Specifically, the second voltage level VL is different from the first voltage level VH. For example, the first voltage level VH is greater than the second voltage level VL.

In some embodiments, as shown in FIG. 3, since the clock input end of the flip-flop circuit 251 receives the clock control signal CCS with the second voltage level VL, the flip-flop circuit 251 will maintain the output state of the data output end Q. In other words, as shown in FIG. 4, at the time point T2, the flip-flop circuit 251 maintains, in response to the clock control signal CCS with the second voltage level VL, the voltage level of the undershoot suppression signal USS in the first voltage level VH, to generate the undershoot suppression pulse USP. Accordingly, the control signal generation circuit 130 continues simultaneously enabling the plurality of power stage circuits 11[1]-11[8] through the plurality of control signals PWM[1]-PWM[8], so that the output voltage Vout keeps approaching the reference voltage VDAC.

In some embodiments, as shown in FIG. 4, at the time point T3, the output voltage Vout rises to the reference voltage VDAC (namely, the output voltage Vout is not smaller than the reference voltage VDAC). Accordingly, at the time point T3, the comparison circuit 231 in FIG. 3 generates the reset signal RSTS with the first voltage level VH.

In some embodiments, as shown in FIG. 3, since the reset end RST of the flip-flop circuit 251 receives the reset signal RSTS with the first voltage level VH, the flip-flop circuit 251 will force the data output end Q to enter a reset state. Specifically, as shown in FIG. 4, at the time point T3, the flip-flop circuit 251 switches, in response to the reset signal RSTS with the first voltage level VH, the voltage level of the undershoot suppression signal USS from the first voltage level VH to the second voltage level VL, to stop generating the undershoot suppression pulse USP. Accordingly, the control signal generation circuit 130 resumes sequentially enabling the plurality of power stage circuits 11[1]-11[8] through the plurality of control signals PWM[1]-PWM[8].

It can be seen from the description of the above-mentioned embodiments that the rising edge determination circuit 21 is configured to control the clock control signal CCS to be in the first voltage level VH when the difference voltage Vdiff is greater than the threshold voltage Vth. The falling edge determination circuit 23 is configured to control the reset signal RSTS to be in the first voltage level VH when the output voltage Vout is not smaller than the reference voltage VDAC. The pulse generation circuit 25 is configured to switch, in response to the clock control signal CCS with the first voltage level VH, the undershoot suppression signal USS from the second voltage level VL to the first voltage level VH, and then again switch, in response to the reset signal RSTS with the first voltage level VH, the undershoot suppression signal USS from the first voltage level VH to the second voltage level VL, to generate the undershoot suppression pulse USP.

That is, when the undershoot of the output voltage Vout is detected (namely, the difference voltage Vdiff between the reference voltage VDAC and the output voltage Vout is greater than the threshold voltage Vth), the undershoot suppression circuit 132 can generate the undershoot suppression pulse USP to trigger the control signal generation circuit 130 to simultaneously enable the plurality of power stage circuits 11[1]-11[8], until the output voltage Vout is detected having reached or approaching the reference voltage VDAC. Thus, the undershoot phenomenon of the output voltage Vout can be mitigated.

Furthermore, as shown in FIG. 4, an output period P1 of the undershoot suppression pulse USP is between the time point T1 of switching the clock control signal CCS from the second voltage level VL to the first voltage level VH and the time point T3 of switching the reset signal RSTS from the second voltage level VL to the first voltage level VH.

It should be understood that the rising edge determination circuit 21 is further configured to control the clock control signal CCS to be in the second voltage level VL when the difference voltage Vdiff is not greater than the threshold voltage Vth (e.g., before the time point T1 or after the time point T2). In addition, the falling edge determination circuit 23 is further configured to control the reset signal RSTS to be in the second voltage level VL when the output voltage Vout is smaller than the reference voltage VDAC (e.g, between the time point T1 and the time point T3).

In above-mentioned embodiments, as shown in FIG. 4, the reference voltage VDAC may change according to the value of the output current Iout. For example, the greater the value of the output current Iout, the smaller the reference voltage VDAC. However, the present disclosure is not limited thereto. For example, in some embodiments, the reference voltage VDAC is in a fixed voltage level.

Figure 5:
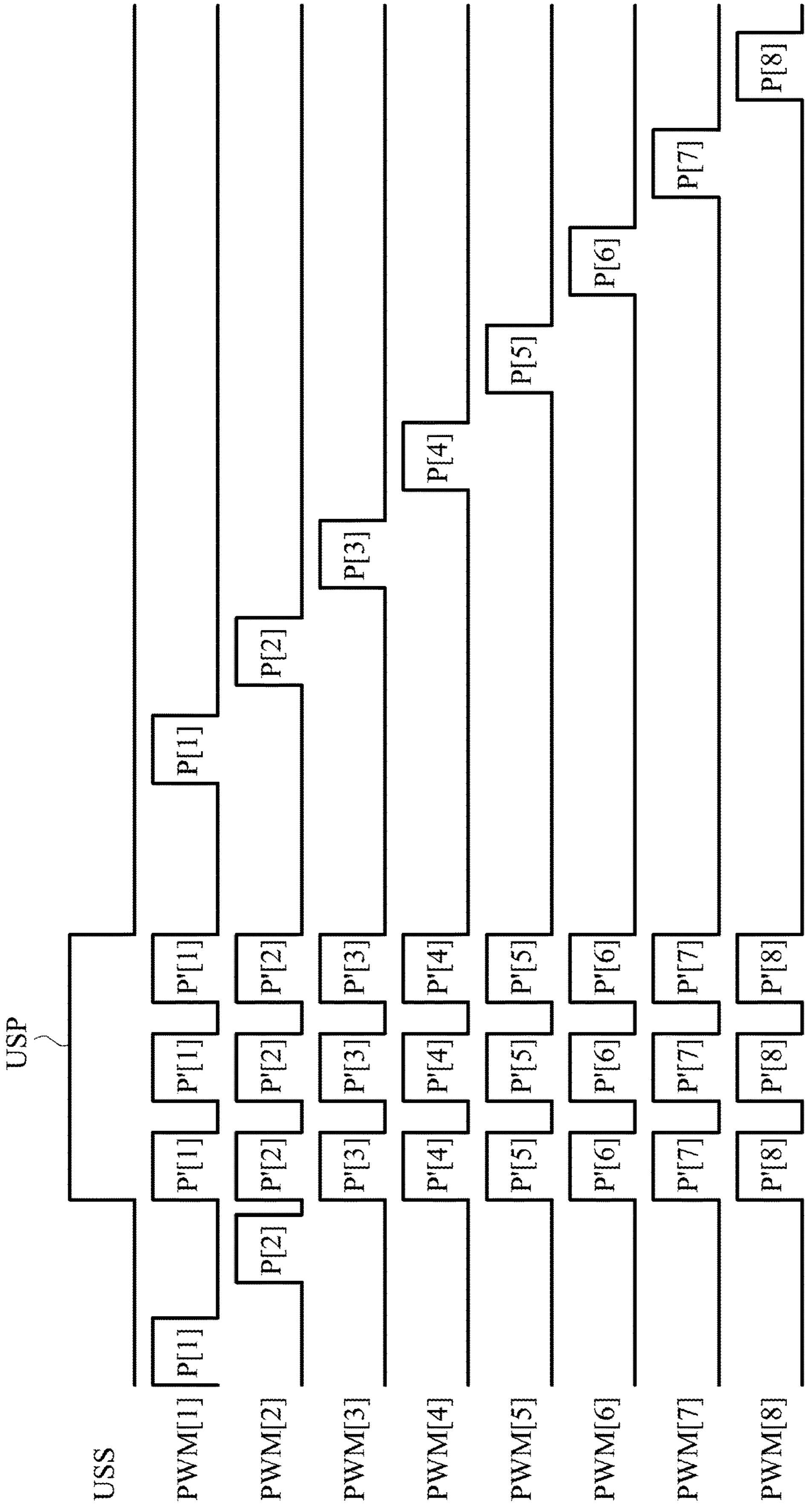
FIG. 5 is a signal sequence diagram of an undershoot suppression signal and a control signal according to some embodiments of the present disclosure.

Referring to FIG. 5, FIG. 5 is a sequence diagram of the undershoot suppression signal USS and the plurality of control signals PWM[1]-PWM[8] according to some embodiments of the present disclosure. As described in the embodiment illustrated in FIG. 1, the plurality of control signals PWM[1]-PWM[8] are configured to control the operations of the plurality of power stage circuits 11[1]-11[8], respectively. In some embodiments, before the generation of the undershoot suppression pulse USP, the control signal generation circuit 130 has sequentially enabled the power stage circuit 11[1] and the power stage circuit 11[2] through an enabling pulse P[1] of the control signal PWM[1] and an enabling pulse P[2] of the control signal PWM[2], but has yet to enable the remaining power stage circuits 11[3]-11[8]. That is, upon the generation of the undershoot suppression pulse USP, the power stage circuit 11[1] has entered a disabled state (namely, without receiving the enabling pulse P[1]) for a period of time, but the power stage circuit 11[2] has just entered a disabled state (namely, without receiving the enabling pulse P[2]) not long ago.

In some embodiments, as shown in FIG. 5, in the output period of the undershoot suppression pulse USP, the control signal generation circuit 130 adjusts the voltage levels of the plurality of control signals PWM[1]-PWM[8] according to the above-mentioned preset duty ratio, so that the plurality of control signals PWM[1]-PWM[8] simultaneously generate at least one supplementary pulse P', respectively. Thus, the plurality of power stage circuits 11[1]-11[8] will together be alternately enabled and disabled, to increase the output current Iout and mitigate the undershoot phenomenon of the output voltage Vout. In addition, after the generation of the undershoot suppression pulse USP is stopped, the control signal generation circuit 130 resumes sequentially enabling the plurality of power stage circuits 11[1]-11[8]. In some embodiments, the rising edge and the falling edge of the undershoot suppression pulse USP in FIG. 5 may not be overlapped with the enabling pulse and the supplementary pulse, or may be aligned with the rising edge and the falling edge of the supplementary pulse, respectively.

Figure 6:
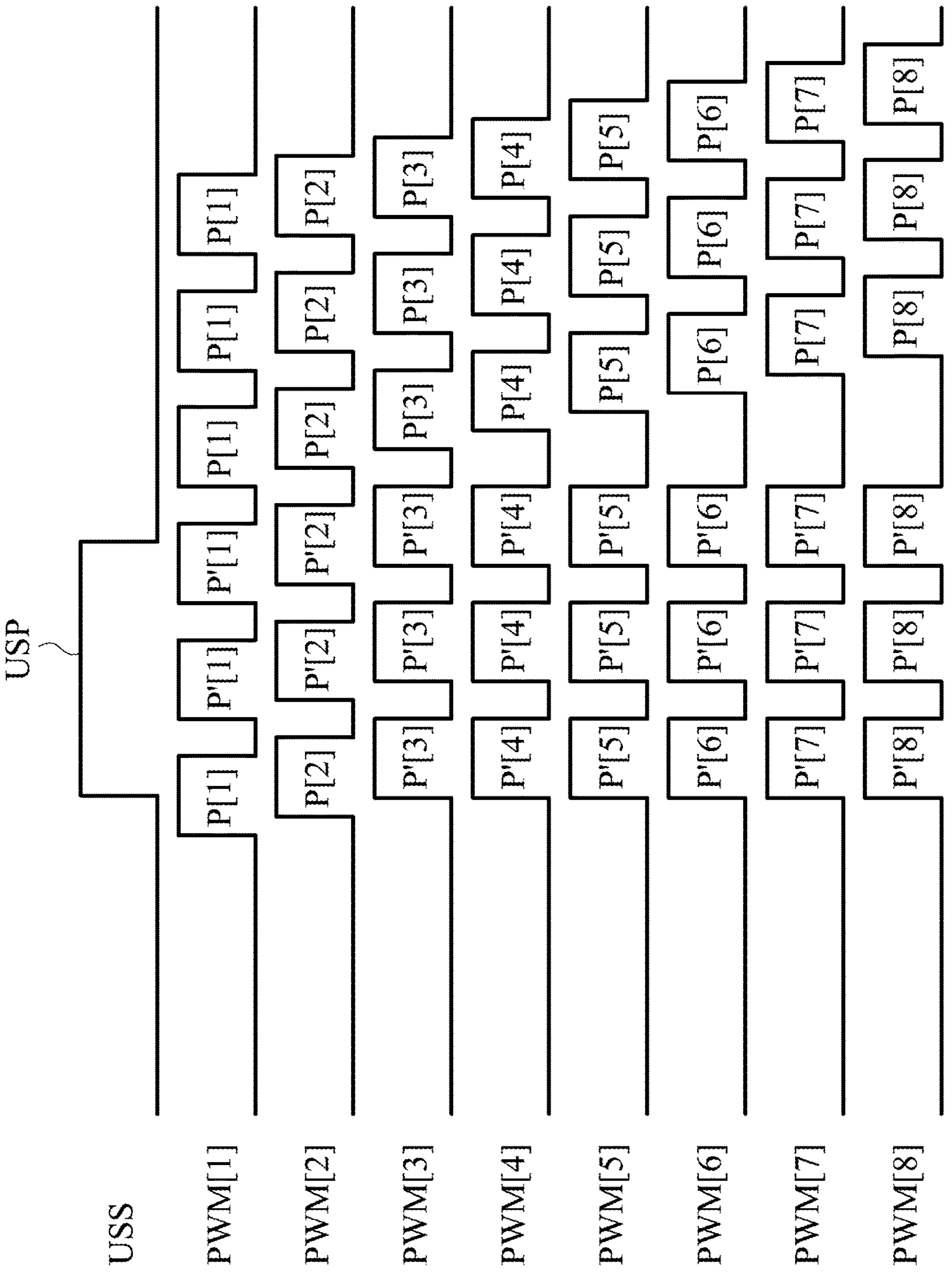
FIG. 6 is a signal sequence diagram of an undershoot suppression signal and a control signal according to some embodiments of the present disclosure.

Referring to FIG. 6, FIG. 6 is a sequence diagram of the undershoot suppression signal USS and the plurality of control signals PWM[1]-PWM[8] according to some embodiments of the present application. In some embodiments, upon the generation of the undershoot suppression pulse USP, the control signal generation circuit 130 is sequentially enabling the power stage circuit 11[1] and the power stage circuit 11[2] through the enabling pulse P[1] of the control signal PWM[1] and the enabling pulse P[2] of the control signal PWM[2], but has yet to enable the remaining power stage circuits 11[3]-11[8].

In some embodiments, as shown in FIG. 6, at the beginning of the output period of the undershoot suppression pulse USP, the control signal generation circuit 130 maintains the enabling pulses P[1]-P[2] according to the above-mentioned preset duty ratio, and adjusts the voltage levels of some control signals PWM[3]-PWM[8] according to the preset duty ratio, so that the control signals PWM[3]-PWM[8] simultaneously generate the supplementary pulse P', respectively. In the remaining output period of the undershoot suppression pulse USP, the control signal generation circuit 130 will adjust the voltage levels of the plurality of control signals PWM[1]-PWM[8] according to the above-mentioned preset duty ratio based on a sequence relationship between the enabling pulses P[1]-P[2] and the supplementary pulses P'[3]-P'[8], so that the plurality of control signals PWM[1]-PWM[8] generate at least one supplementary pulse P', respectively. Thus, the power stage circuits 11[3]-11[8] are alternately enabled and disabled in a simultaneous manner. The power stage circuit 11[2] will also be alternately enabled and disabled when it slightly leads the power stage circuits 11[3]-11[8] in terms of timing. The power stage circuit 11[1] will also be alternately enabled and disabled when it slightly leads the power stage circuit 11[2] in terms of timing, thereby increasing the output current Iout and mitigating the undershoot phenomenon of the output voltage Vout. In addition, as described in the embodiment illustrated in FIG. 5, after the generation of the undershoot suppression pulse USP is stopped, the control signal generation circuit 130 resumes sequentially enabling the plurality of power stage circuits 11[1]-11[8], rather than simultaneously enabling the plurality of power stage circuits 11[1]-11[8]. In some embodiments, the rising edge and the falling edge of the undershoot suppression pulse USP in FIG. 6 may be overlapped with the enabling pulses and the supplementary pulses, respectively.

Figure 7:
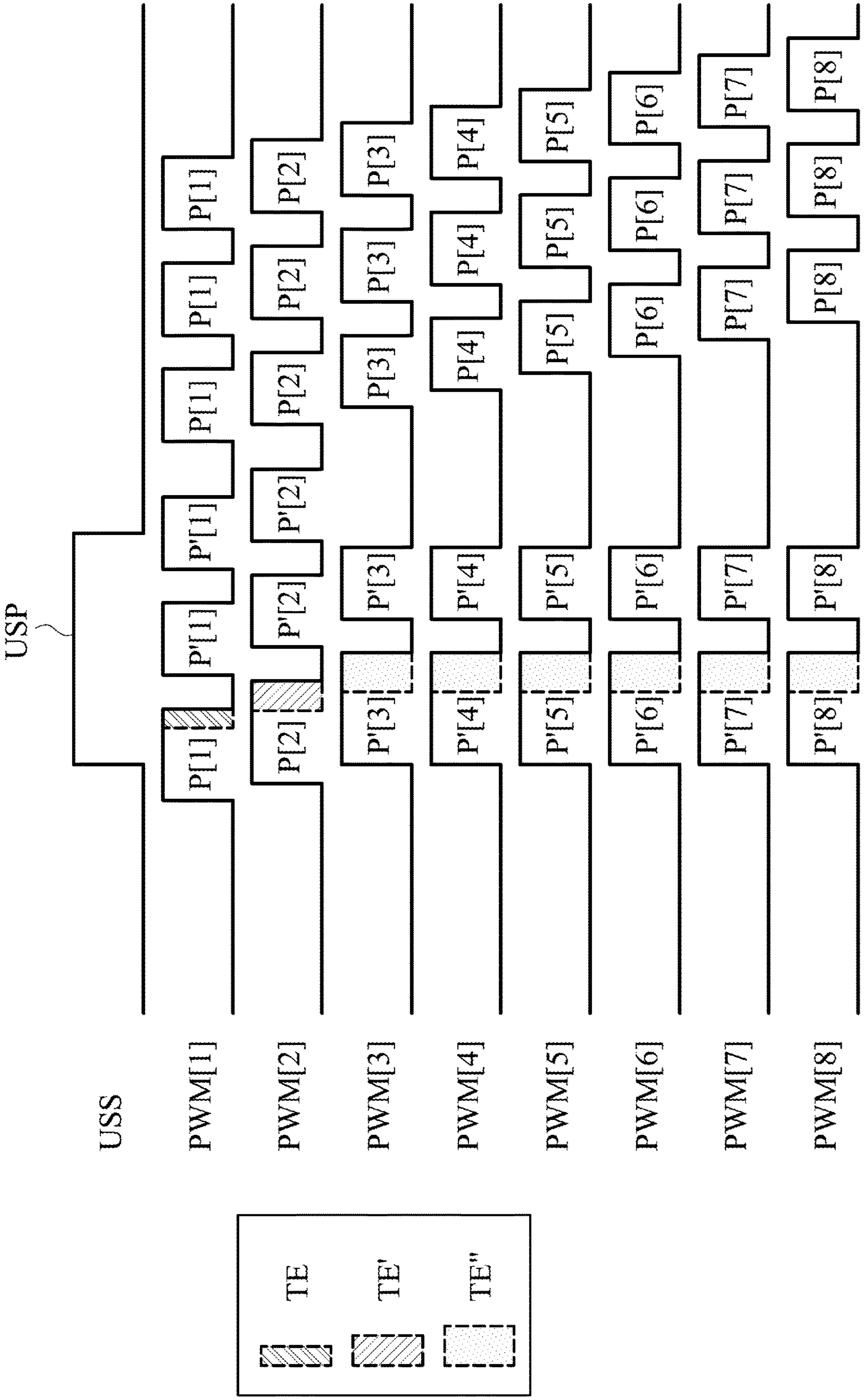
FIG. 7 is a signal sequence diagram of an undershoot suppression signal and a control signal according to some embodiments of the present disclosure.

Referring to FIG. 7, FIG. 7 is a sequence diagram of the undershoot suppression signal USS and the plurality of control signals PWM[1]-PWM[8] according to some embodiments of the present application. The embodiment illustrated in FIG. 7 is similar to that illustrated in FIG. 6. The embodiment illustrated in FIG. 7 differs from that illustrated in FIG. 6 in that the control signal generation circuit 130 extends, at the beginning of the output period of the undershoot suppression pulse USP, the output periods of the enabling pulses P[1]-P[2] and the supplementary pulses P'[3]-P'[8], to increase the enabled ratio of the power stage circuit 11 in the output period of the undershoot suppression pulse USP. Specifically, the output period of the enabling pulse P[1] is extended by a period TE, the output period of the enabling pulse P[2] is extended by a period TE', and the output periods of the supplementary pulses P'[3]-P'[8] are extended by a period TE", where the periods TE, TE' and TE" may be different in length. In some embodiments, the rising edge and the falling edge of the undershoot suppression pulse USP in FIG. 7 may be overlapped with the enabling pulses and the supplementary pulses, respectively. The remaining description of the embodiment illustrated in FIG. 7 is similar to the description of the embodiment illustrated in FIG. 6, and thus is not described here.

In the above-mentioned embodiments, the control signal generation circuit 130 simultaneously enables the plurality of power stage circuits 11[1]-11[8] through the plurality of control signals PWM[1]-PWM[8] according to the undershoot suppression pulse USP, but the present disclosure is not limited thereto. For example, in some embodiments, the control signal generation circuit 130 may simultaneously enable some of the plurality of power stage circuits 11[1]-11[8]. Therefore, the control signal generation circuit 130 may simultaneously enable all or some of the power stage circuits 11 according to the undershoot suppression pulse USP. Moreover, in some embodiments, the control signal generation circuit 130 can adjust the voltage levels of the plurality of control signals PWM according to the undershoot suppression pulse USP to simultaneously generate the plurality of supplementary pulses P', but only output part of the simultaneously generated supplementary pulses P'. That is, some of the plurality of supplementary pulses P' generated at the same time are output while rest of them are not output.

According to the embodiments of the present disclosure, the rising edge of the undershoot suppression pulse USP is determined by detecting whether the difference voltage Vdiff between the reference voltage VDAC and the output voltage Vout is greater than the threshold voltage Vth, and the falling edge of the undershoot suppression pulse USP is determined by the undershoot suppression circuit 132 detecting whether the output voltage Vout is not smaller than the reference voltage VDAC. The undershoot suppression circuit 132 of the present disclosure can automatically control the output period P1 of the undershoot suppression pulse USP according to the voltage level of the output voltage Vout. Therefore, in comparison to some related technologies that require setting parameters and repeatedly adjusting them through testing to make appropriate load transient response, the power supply circuit 100 employing the undershoot suppression circuit 132 of the present disclosure has the advantages of automatic optimization of the load transient response, etc.

Although the present disclosure has been disclosed above in embodiments, the embodiments are not intended to limit the present disclosure, and those of ordinary skill in the art may make various changes and embellishments without departing from the spirit and scope of the present disclosure. Therefore, the scope of protection of the present disclosure shall be defined in the attached claims.

What is claimed is:

1. An undershoot suppression circuit, applicable to a control circuit of at least one power stage circuit, wherein the control circuit is configured to control the at least one power stage circuit to generate an output voltage at an output node electrically coupled to the at least one power stage circuit, and the undershoot suppression circuit comprises:

a rising edge determination circuit, configured to output a clock control signal, to detect a difference voltage between the output voltage and a reference voltage, and to control the clock control signal to be in a first voltage level when the difference voltage is greater than a threshold voltage;

a falling edge determination circuit, configured to output a reset signal, to detect the output voltage, and to control the reset signal to be in the first voltage level when the output voltage is not smaller than the reference voltage; and a pulse generation circuit, electrically coupled to the rising edge determination circuit and the falling edge determination circuit, and configured to receive the clock control signal and the reset signal, and to generate an undershoot suppression pulse according to the clock control signal with the first voltage level and the reset signal with the first voltage level, so that the output voltage approaches the reference voltage.

2. The undershoot suppression circuit according to claim 1, wherein an output period of the undershoot suppression pulse is between a first time point of switching the clock control signal from a second voltage level different from the first voltage level to the first voltage level and a second time point of switching the reset signal from the second voltage level to the first voltage level.

3. The undershoot suppression circuit according to claim 1, wherein when the difference voltage is not greater than the threshold voltage, the rising edge determination circuit controls the clock control signal to be in a second voltage level different from the first voltage level.

4. The undershoot suppression circuit according to claim 1, wherein when the output voltage is smaller than the reference voltage, the falling edge determination circuit controls the reset signal to be in a second voltage level different from the first voltage level.

5. The undershoot suppression circuit according to claim 1, wherein the pulse generation circuit is configured to output an undershoot suppression signal to a control signal generation circuit in the control circuit, wherein the pulse generation circuit switches a voltage level of the undershoot suppression signal to the first voltage level in response to the clock control signal with the first voltage level, and then switches the voltage level of the undershoot suppression signal to a second voltage level different from the first voltage level in response to the reset signal with the first voltage level, to generate the undershoot suppression pulse.

6. The undershoot suppression circuit according to claim 1, wherein the rising edge determination circuit comprises:

a difference calculation circuit, configured to receive the output voltage and the reference voltage, and to generate the difference voltage according to the reference voltage and the output voltage; and a comparison circuit, electrically coupled to the difference calculation circuit, and configured to receive the difference voltage and the threshold voltage and compare the difference voltage with the threshold voltage, to generate the clock control signal with the first voltage level or a second voltage level different from the first voltage level.

7. The undershoot suppression circuit according to claim 1, wherein the falling edge determination circuit comprises:

a comparison circuit, configured to receive the output voltage and the reference voltage and compare the output voltage with the reference voltage, to generate the reset signal with the first voltage level or a second voltage level different from the first voltage level.

8. The undershoot suppression circuit according to claim 1, wherein the pulse generation circuit comprises:

a flip-flop circuit, comprising a data input end, a clock input end, a reset end and a data output end, wherein the data input end is configured to receive an enabling signal with the first voltage level, the clock input end is configured to receive the clock control signal, the reset end is configured to receive the reset signal, and the data output end is configured to output an undershoot suppression signal, wherein the flip-flop circuit switches a voltage level of the undershoot suppression signal to the first voltage level of the enabling signal in response to the clock control signal with the first voltage level, maintains the voltage level of the undershoot suppression signal in the first voltage level in response to the clock control signal with a second voltage level different from the first voltage level, and resets the voltage level of the undershoot suppression signal to the second voltage level in response to the reset signal with the first voltage level, to generate the undershoot suppression pulse.

9. The undershoot suppression circuit according to claim 1, wherein the control circuit is further configured to control the at least one power stage circuit to generate an output current at the output node, and a voltage level of the reference voltage drops along with an increase in value of the output current.

10. A power supply circuit, comprising:

a control signal generation circuit, configured to output a plurality of control signals;

a plurality of power stage circuits, electrically coupled to the control signal generation circuit and an output node of the power supply circuit, and configured to receive the plurality of control signals, wherein the control signal generation circuit is configured to sequentially enable the plurality of power stage circuits through the plurality of control signals, so that an output voltage is generated at the output node; and an undershoot suppression circuit, electrically coupled to the output node and the control signal generation circuit, and configured to detect the output voltage and receive a reference voltage and a threshold voltage, wherein the undershoot suppression circuit generates an undershoot suppression pulse to the control signal generation circuit in response to a detection that the output voltage is smaller than the reference voltage and that a difference between the output voltage and the reference voltage exceeds the threshold voltage, so that the output voltage approaches the reference voltage, wherein the undershoot suppression circuit stops generating the undershoot suppression pulse to the control signal generation circuit in response to a detection that the output voltage is not smaller than the reference voltage.

11. The power supply circuit according to claim 10, wherein the undershoot suppression circuit comprises:

a rising edge determination circuit, configured to output a clock control signal, to detect a difference voltage between the output voltage and the reference voltage, and to control the clock control signal to be in a first voltage level when the difference voltage is greater than the threshold voltage;

a falling edge determination circuit, configured to output a reset signal, to detect the output voltage, and to control the reset signal to be in the first voltage level when the output voltage is not smaller than the reference voltage; and a pulse generation circuit, electrically coupled to the rising edge determination circuit and the falling edge determination circuit, and configured to receive the clock control signal and the reset signal, and to generate the undershoot suppression pulse according to the clock control signal with the first voltage level and the reset signal with the first voltage level.

12. The power supply circuit according to claim 11, wherein an output period of the undershoot suppression pulse is between a first time point of switching the clock control signal from a second voltage level different from the first voltage level to the first voltage level and a second time point of switching the reset signal from the second voltage level to the first voltage level.

13. The power supply circuit according to claim 11, wherein the rising edge determination circuit comprises:

a difference calculation circuit, configured to receive the output voltage and the reference voltage, and to generate the difference voltage by subtracting the output voltage from the reference voltage; and a comparison circuit, electrically coupled to the difference calculation circuit, and configured to receive the difference voltage and the threshold voltage and compare the difference voltage with the threshold voltage, to generate the clock control signal with the first voltage level or a second voltage level different from the first voltage level.

14. The power supply circuit according to claim 11, wherein the falling edge determination circuit comprises:

a comparison circuit, configured to receive the output voltage and the reference voltage and compare the output voltage with the reference voltage, to generate the reset signal with the first voltage level or a second voltage level different from the first voltage level.

15. The power supply circuit according to claim 11, wherein the pulse generation circuit comprises:

a flip-flop circuit, comprising a data input end, a clock input end, a reset end and a data output end, wherein the data input end is configured to receive an enabling signal with the first voltage level, the clock input end is configured to receive the clock control signal, the reset end is configured to receive the reset signal, and the data output end is configured to output an undershoot suppression signal, wherein the flip-flop circuit switches a voltage level of the undershoot suppression signal to the first voltage level of the enabling signal in response to the clock control signal with the first voltage level, maintains the voltage level of the undershoot suppression signal in the first voltage level in response to the clock control signal with a second voltage level different from the first voltage level, and resets the voltage level of the undershoot suppression signal to the second voltage level in response to the reset signal with the first voltage level, to generate the undershoot suppression pulse.

16. The power supply circuit according to claim 10, wherein the undershoot suppression circuit comprises:

a difference calculation circuit, configured to receive the output voltage and the reference voltage, and to generate a difference voltage according to the difference between the reference voltage and the output voltage;

a first comparison circuit, electrically coupled to the difference calculation circuit, and configured to receive the difference voltage and the threshold voltage and compare the difference voltage with the threshold voltage, to generate a clock control signal;

a second comparison circuit, configured to receive the output voltage and the reference voltage and compare the output voltage with the reference voltage, to generate a reset signal; and a flip-flop circuit, comprising a data input end, a clock input end, a reset end and a data output end, wherein the data input end is configured to receive an enabling signal with a first voltage level, the clock input end is configured to receive the clock control signal, the reset end is configured to receive the reset signal, and the data output end is configured to output an undershoot suppression signal.

17. The power supply circuit according to claim 16, wherein when the difference voltage is greater than the threshold voltage, the first comparison circuit generates the clock control signal with the first voltage level, and the flip-flop circuit switches a voltage level of the undershoot suppression signal to the first voltage level of the enabling signal in response to the clock control signal with the first voltage level, to generate the undershoot suppression pulse.

18. The power supply circuit according to claim 16, wherein when the difference voltage is not greater than the threshold voltage, the first comparison circuit generates the clock control signal with a second voltage level different from the first voltage level, and the flip-flop circuit maintains a voltage level of the undershoot suppression signal in the first voltage level in response to the clock control signal with the second voltage level, to generate the undershoot suppression pulse.

19. The power supply circuit according to claim 16, wherein when the output voltage is not smaller than the reference voltage, the second comparison circuit generates the reset signal with the first voltage level, and the flip-flop circuit switches the undershoot suppression signal from the first voltage level to a second voltage level different from the first voltage level in response to the reset signal with the first voltage level, to stop generating the undershoot suppression pulse.

20. The power supply circuit according to claim 16, wherein, when the output voltage is smaller than the reference voltage, the second comparison circuit generates the reset signal with a second voltage level different from the first voltage level.

* * * * *